(12) United States Patent
Grimm et al.

(10) Patent No.: US 7,787,983 B2
(45) Date of Patent: Aug. 31, 2010

(54) METHOD FOR SEQUENTIAL PROGRAMMING OF AN INJECTION MOLDING CYCLE OF AN INJECTION MOLDING MACHINE

(75) Inventors: Günther Grimm, Hilgertshausen (DE); Markus Betsche, Rosenheim (DE); Dietrich Hunold, Marienheide (DE)

(73) Assignee: KraussMaffei Technologies GmbH, München (DE)

( * ) Notice: Subject to any disclaimer, the term of this patent is extended or adjusted under 35 U.S.C. 154(b) by 300 days.

(21) Appl. No.: 11/943,165

(22) Filed: Nov. 20, 2007

(65) Prior Publication Data

US 2008/0065261 A1  Mar. 13, 2008

Related U.S. Application Data

(63) Continuation of application No. PCT/EP2006/061800, filed on Apr. 25, 2006.

(30) Foreign Application Priority Data

May 24, 2005 (DE) ............... 10 2005 023 919

(51) Int. Cl.
*B29C 45/00* (2006.01)
*G05B 11/01* (2006.01)
*G05B 13/02* (2006.01)
*G06F 19/00* (2006.01)

(52) U.S. Cl. ............ 700/200; 700/23; 700/47; 700/181; 700/201; 264/478; 156/125

(58) Field of Classification Search .......... 700/18, 700/23, 28, 47, 86, 181, 197–198, 200–201; 156/125; 264/37.27, 37.33, 297.1–297.3, 264/478, 645; 425/145, 557
See application file for complete search history.

(56) References Cited

U.S. PATENT DOCUMENTS

| 4,224,501 | A | | 9/1980 | Lindbom et al. |
| 4,696,632 | A | | 9/1987 | Inaba |
| 5,028,365 | A | * | 7/1991 | Neko et al. ............... 264/40.1 |
| 5,536,159 | A | * | 7/1996 | Yamamura et al. ......... 425/149 |
| 5,811,134 | A | | 9/1998 | Takizawa |
| 6,381,512 | B1 | * | 4/2002 | Saitou et al. ............... 700/200 |
| 6,695,994 | B2 | * | 2/2004 | Bulgrin et al. ............ 264/40.1 |
| 2002/0188375 | A1 | | 12/2002 | Shioiri et al. |
| 2003/0090018 | A1 | * | 5/2003 | Bulgrin .................... 264/40.1 |
| 2004/0139810 | A1 | * | 7/2004 | Saito et al. ................. 73/865.9 |

(Continued)

FOREIGN PATENT DOCUMENTS

AT   007396 U1   3/2005

(Continued)

*Primary Examiner*—Ramesh B Patel
(74) *Attorney, Agent, or Firm*—Henry M. Feiereisen; Ursula B. Day

(57) ABSTRACT

In a method for sequentially programming an injection molding cycle of an injection molding machine comprising one or several injection molds, the injection molding cycle is started manually step by step. The parts of the injection molding machine and/or the parts of the injection mold(s) are manually displaced into the positions or states required for the injection molding cycle in the order required for the injection molding cycle. The movement sequence (the actions and the obtained states) of the machine parts and/or the mold parts is stored in a controller.

6 Claims, 6 Drawing Sheets

U.S. PATENT DOCUMENTS

2005/0092113 A1* 5/2005 Saito et al. .............. 73/865.9

FOREIGN PATENT DOCUMENTS

| | | | |
|---|---|---|---|
| DE | 4210259 | A1 | 9/1993 |
| DE | 19808679 | C1 | 7/1999 |
| DE | 19929821 | A1 | 3/2000 |
| DE | 19900117 | A1 | 7/2000 |
| DE | 10246925 | A1 | 4/2003 |
| DE | 10230497 | A1 | 1/2004 |
| EP | 0792726 | A1 | 9/1997 |
| EP | 0875353 | A1 | 11/1998 |
| EP | 1048995 | A2 | 11/2000 |
| EP | 1270172 | A1 | 1/2003 |

* cited by examiner

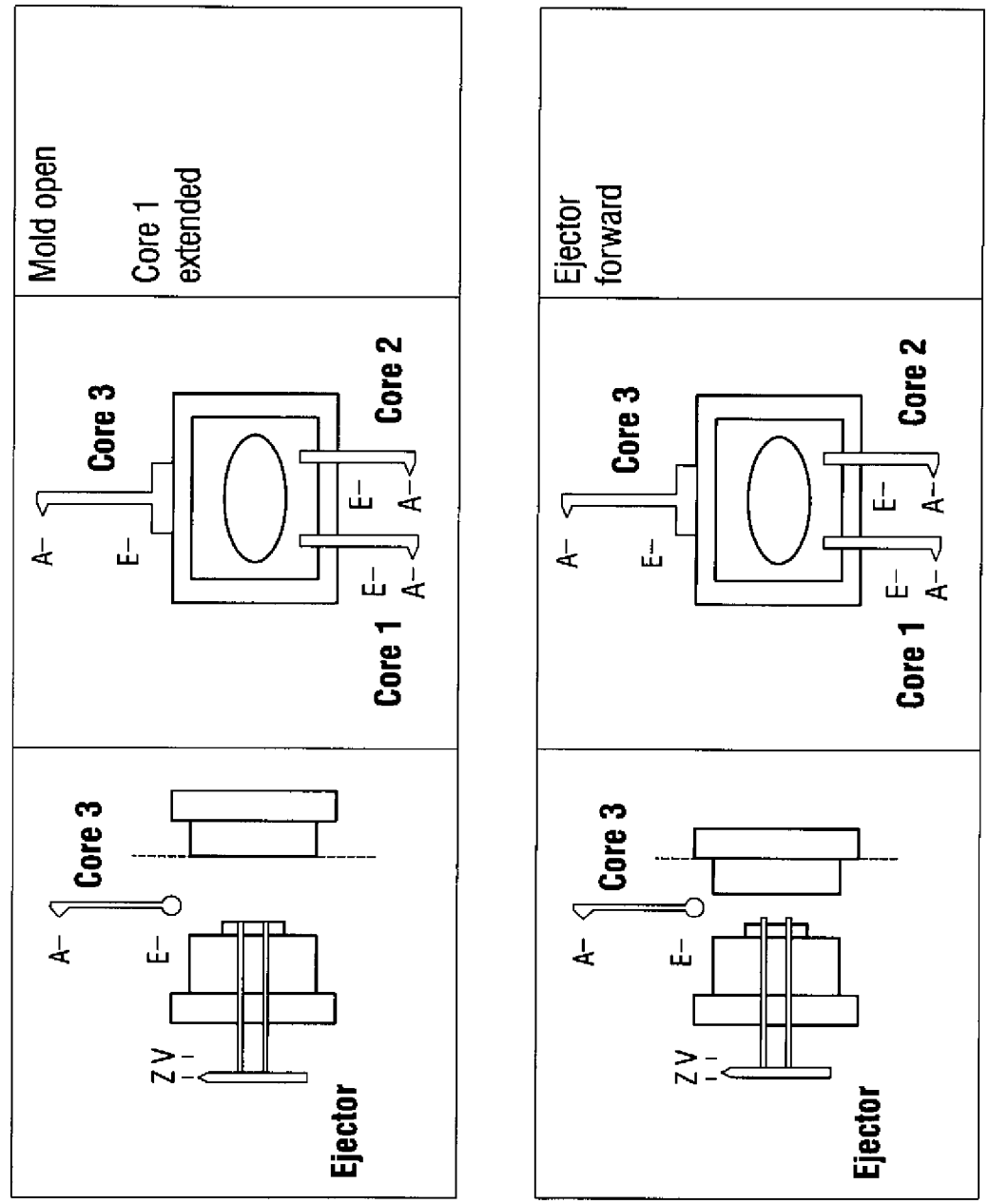

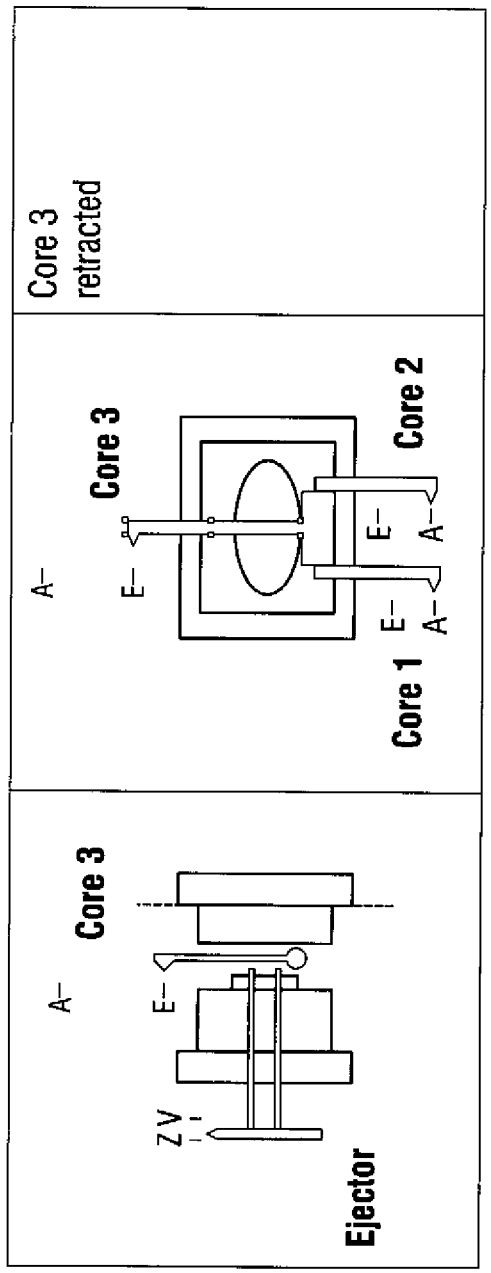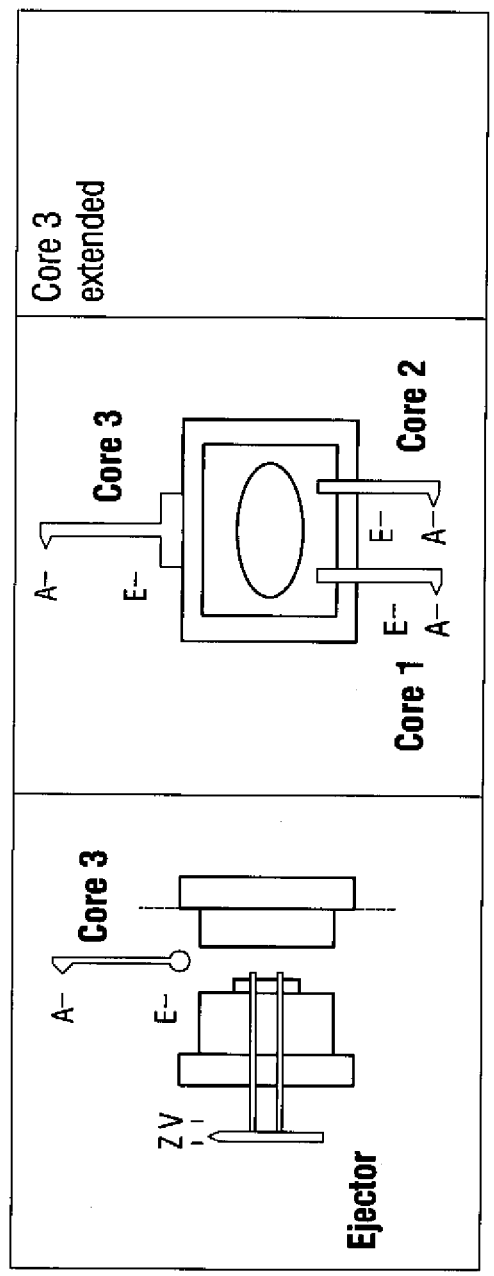
Fig. 9
Fig. 10

METHOD FOR SEQUENTIAL PROGRAMMING OF AN INJECTION MOLDING CYCLE OF AN INJECTION MOLDING MACHINE

CROSS-REFERENCES TO RELATED APPLICATIONS

This application is a continuation of prior filed copending PCT International application no. PCT/EP2006/061800, filed Apr. 25, 2006, which designated the United States and has been published but not in English as International Publication No. WO 2006/125706 and on which priority is claimed under 35 U.S.C. §120, and which claims the priority of German Patent Application, Ser. No. 102005023919.6, filed May 24, 2005, pursuant to 35 U.S.C. 119(a)-(d), the content(s) of which is/are incorporated herein by reference in its entirety as if fully set forth herein.

BACKGROUND OF THE INVENTION

The present invention relates to a method for sequential programming of an injection molding cycle of an injection molding machine.

Nothing in the following discussion of the state of the art is to be construed as an admission of prior art.

An injection molding cycle, i.e., the operation of an injection molding machine, can be programmed in a conventional manner with a stored program controller (SPS) located at the injection molding machine itself (online) or at a separate terminal located remote from the injection molding machine (off-line). When programmed online, the injection molding machine is unavailable for production during a considerable length of time. Conversely, when programmed off-line, the injection molding machine typically needs to be stopped only briefly to make fine adjustments in the programming.

These stored program controllers typically include data processing programs for setup and operation of an injection molding machine. Different manufacturers of injection molding machines typically offer a stored program control customized for their own (proprietary) machine program. Disadvantageously, the process flow of an injection molding cycle in these controllers cannot be changed or only with the assistance from the machine manufacturer. The user or custom molder is prevented from programming the controller.

Stored program process controllers are now available with tools which enable the user or custom molder to assemble the process flow of an injection molding cycle from predefined elements (macros). Such stored program process controllers are described in the publication "Kunststoffe" (*Plastics*), Vol. 08/2003, pages 46-49.

A custom molder, who operates injection molding machines from different manufacturers, should have experience with different stored program process controllers so as to be able to correctly program all process flows and movements required for fabricating a certain product.

It already proves difficult to be competent with a stored program process control from a single manufacturer; and if a person is not constantly involved with this particular program and/or if a new process needs to be programmed after some time (for example, because a different product needs to be manufactured), then the person must become again familiar with this program, which may be quite time-consuming. The situation becomes more complicated, when injection molding machines from different manufacturers must be programmed which requires familiarity with different stored program process controllers.

Process flow diagrams from mold manufacturers provide some support for programming a process flow of an injection molding machine. Such flow diagrams describe and illustrate in detail the required movement and timing of the parts of a mold, so that the molded part is produced correctly and can be easily removed from the mold. However, these flow diagrams must still be entered into the stored program controller (SPS) or converted to the "correct" process programming sequence, which requires a certain familiarity with these controllers. Moreover, these flow diagrams are not available for each mold. In addition, errors may occur when a data describing positions, such as "advanced" and "returned", or "moved in" and "moved out" are not unambiguous. Moreover, operating personnel frequently does not have the required technical knowledge of the injection molding machines and molds.

All stored program controllers (SPS) and the afore-described stored program process controllers have an inherent problem in that the entire injection molding cycle is first entered in the controller and thereafter executed in its entirety, without being able to risk-free test the cycle or sections of the cycle. Any errors can severely damage the molds.

Programming of machines can be simplified with so-called "teach-in systems" which represent additional tools designed to facilitate programming of complex machines and which typically do not require programming experience or familiarity with the machine control. DE 199 00 117 A1 discloses a teach-in system for programming grinding machines or other machine tools. This teach-in system includes a graphic user interface for the display of blanks, workpieces and tools. The illustrated elements can be placed in any relation with one another by moving corresponding control elements. The resulting movements are recorded by the teach-in module and translated into a machine control program; alternatively, an existing machine control program is altered by these movements. This system represents a so-called virtual teach-in system.

Other teach-in methods and teach-in systems are known from programmable industrial robots, for example, for teaching the controller of a robot the movement of a manipulator arm relative to a workpiece (teaching the robot). The desired movement of the robot is manually entered into an input device, either numerically or graphically. A data processing program converts the corresponding input values into a "movement program" for the industrial robot, i.e., the movement is programmed automatically. Teach-in systems for industrial robots are disclosed, for example, in EP 0 792 726 B1 and U.S. Pat. No. 4,224,501.

It would therefore be desirable and advantageous to provide an improved method for simplifying programming the process flow of an injection molding cycle of an injection molding machine, which obviates prior art shortcomings and which can be used independent of manufacturer-specific programs and hence universally with any injection molding machine.

SUMMARY OF THE INVENTION

According to one aspect of the present invention, a method for programming a process sequence of an injection molding cycle of an injection molding machine having one or more injection molds includes the steps of executing the injection molding cycle manually by moving the machine parts of the injection molding machine or the mold parts of the injection mold(s) sequentially into respective positions required for the injection molding cycle, and storing actions or states, or both, of the machine parts or the mold parts in a memory of a controller.

By having an operator manually execute the injection molding cycle step-by-step and displaying to the operator during programming where the machine parts and/or mold sections, such as cores, are moved, is becomes unimportant how of the respective accessed position or the accessed state is identified. This prevents errors of the kind that can occur with manually programmed stored program controllers, when expressions such as "moved in" and "moved out" are misinterpreted and when the entire movement is executed in one pass at the end of the completed programming process. In addition, an operator can implement even complex process flows without having detailed knowledge about the controller; only the movement of the molds must be known. The method has the additional advantage that errors can be identified before they become critical.

The resulting forces during movement of the machine parts and/or mold parts are drastically reduced when the teach-in takes place in the setup mode, thus minimizing damage in the event of errors.

According to another feature of the present invention, after the teach-in is completed, the process flow can be optimized by having the operator execute the injection molding cycle one-time automatically, and by subsequently changing the parameters to optimize the process. For example, the ejector or a core puller can be moved faster by suitably increasing the quantity of hydraulic fluid, for example in hydraulic injection molding machines.

According to another feature of the present invention, sections of the injection molding cycle can be edited using conventional programming methods, and the teach-in can be limited to certain functional blocks, for example the operation of core pullers.

According to another feature of the present invention, peripheral devices may be provided, wherein the peripheral devices are moved manually, and actions or states, or both, of the peripheral devices may be stored in the memory of the controller.

According to another feature of the present invention, the injection molding cycle may be executed automatically with the stored actions or states several times, and movement of the machine parts and/or of the mold parts may be optimized by entering parameters in the controller.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 1 to 11 show different actions and states of the injection molding machine and mold parts during a programming cycle, with the illustration on the left side of each FIG. corresponds to a longitudinal cross-section through the mold closing unit of the injection molding machine, and the illustration on the right side of each FIG. representing a top view on the fixed mold half.

DETAILED DESCRIPTION OF PREFERRED EMBODIMENTS

Figure 1:
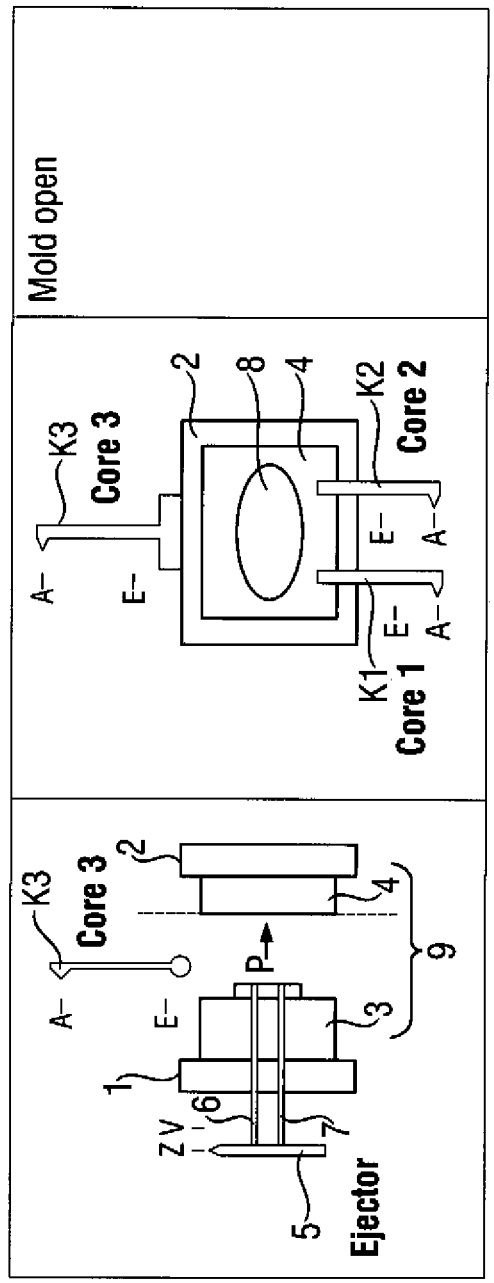

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The Figures shows schematically a movable and a fixed mold platen 1 and 2 with mold halves 3 (movable) and 4 (fixed) of an injection mold 9 of a conventional injection molding machine which is not illustrated in detail. An ejector plate 5 with two ejector rods 6 and 7 is arranged on the movable mold platen 1, wherein the ejector plate 5 can be moved back and forth between a retracted position z and an advanced position v. In addition, three core pullers K1, K2 and K3 are provided which at different times can be moved in and out of a cavity 8 or between the halves 3 and 4 of the injection mold 9. The extended position is indicated with the reference symbol A and the retracted position with the reference symbol E. In the illustrated example, a cavity 8 is formed in the fixed mold half 4 of the injection mold 9. The illustration on the left side of each FIG. corresponds to a longitudinal cross-section through the mold closing unit of the injection molding machine, whereas the illustration on the right side of each FIG. represents a top view on the fixed mold half 4 seen from the direction of the arrow P in FIG. 1.

Figure 12:
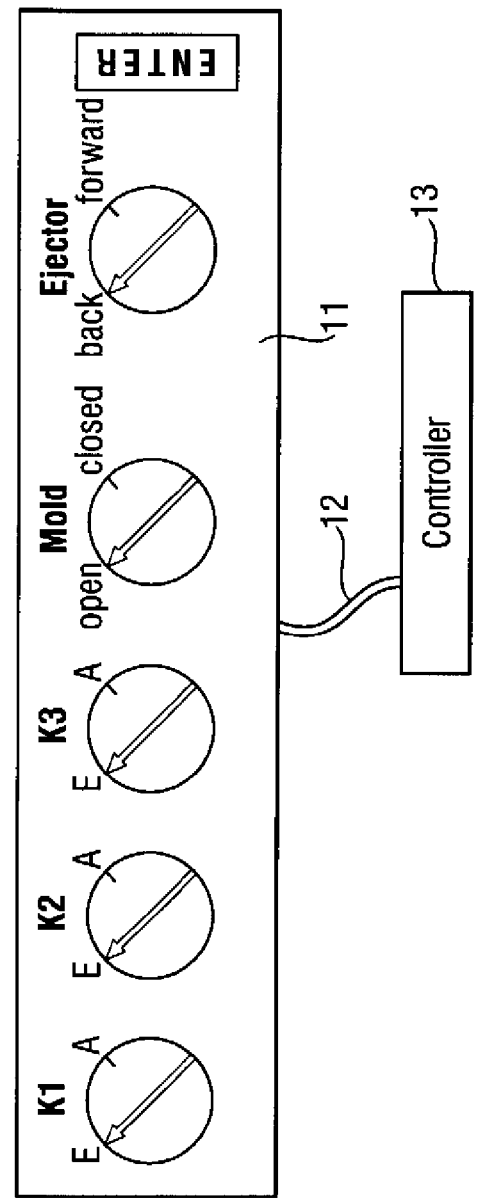
FIG. 12 shows schematically an operator console connected with the machine controller.

The teach-in of the injection molding machine and hence programming of the process flow of the injection molding cycle will now be described in detail. Referring now to FIG. 12 which schematically depicts an operator console 11 connected with the machine controller 13 via a line 12. The operator console 11 has two switches for operating the cores K1, K2 and K3, a switch for opening and closing the mold halves, a switch for advancing and retracting the ejector, and an "ENTER" button for saving the settings.

First, the operator selects the setup mode of the machine controller, during which the machine parts and/or mold parts are operated with a reduced force (for hydraulically operated injection molding machines, with reduced hydraulic pressure). The operator then starts the teach-in mode and manually executes the exemplary injection molding cycle described below. This can be done using manual switches for the movements (on/off or forward/backward), either directly at the operator console 11 of the controller 13 of the injection molding machine or via a separate control device (not illustrated) connected with the operator terminal of the controller 13 by a cable; the data can also transmitted wireless from the separate control device to the controller of the injection molding machine. The executed actions as well as the attained positions and/or states can be saved by having the operator actuate the "ENTER" button.

The process flow now will be described with reference to FIGS. 1 to 11. The accompanying Table 1 shows the corresponding actions and states of the relevant parts corresponding to each of the figures. This Table 1 "corresponds" to the saved program flow. For sake of clarity, only the actions and states applying to the cores, the mold halves and the ejector are described in detail. Additional actions and states executed prior or subsequently are indicated in parentheses and can optionally be entered directly into the machine controller 13. Process parameters, such as displacement speeds, wait times, monitoring times, pressures and the like, can also be entered in the machine controller 13 immediately or upon request during the teach-in phase of the process.

FIG. 1 depicts a situation where the injection mold 9 is open, the ejector 5 is in the retracted position z, and all core pullers K1, K2 and K3 are in the extended position A. These positions or states are stored in the controller 13 of the injection molding machine as initial positions.

Figure 2:
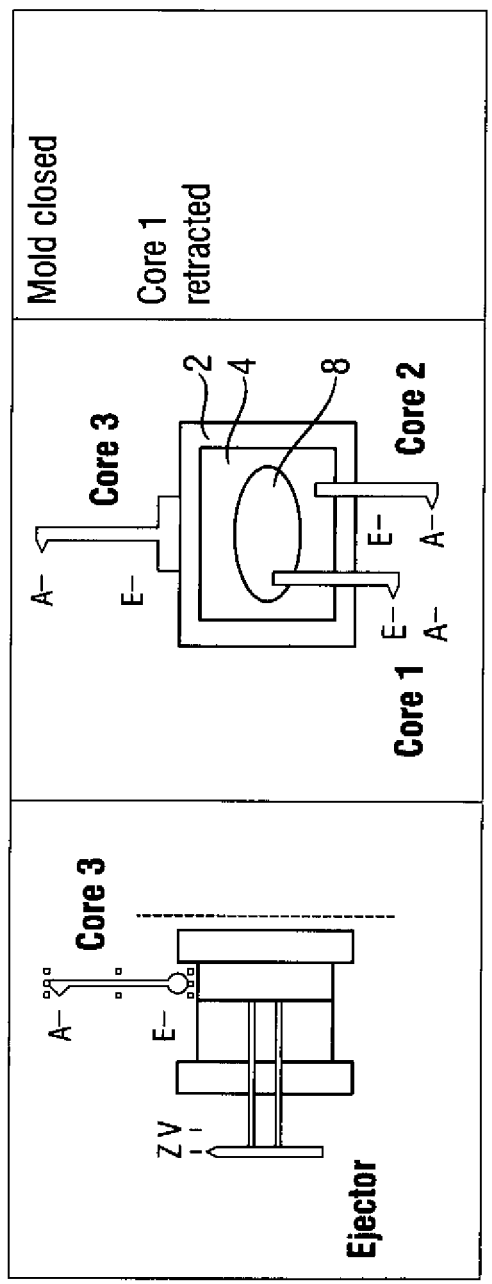

FIG. 2 shows the injection mold 9 in the closed position, with the core K1 being moved into the cavity 8 to form an undercut. The attained positions and/or states are then stored in the controller 13.

Figure 3:
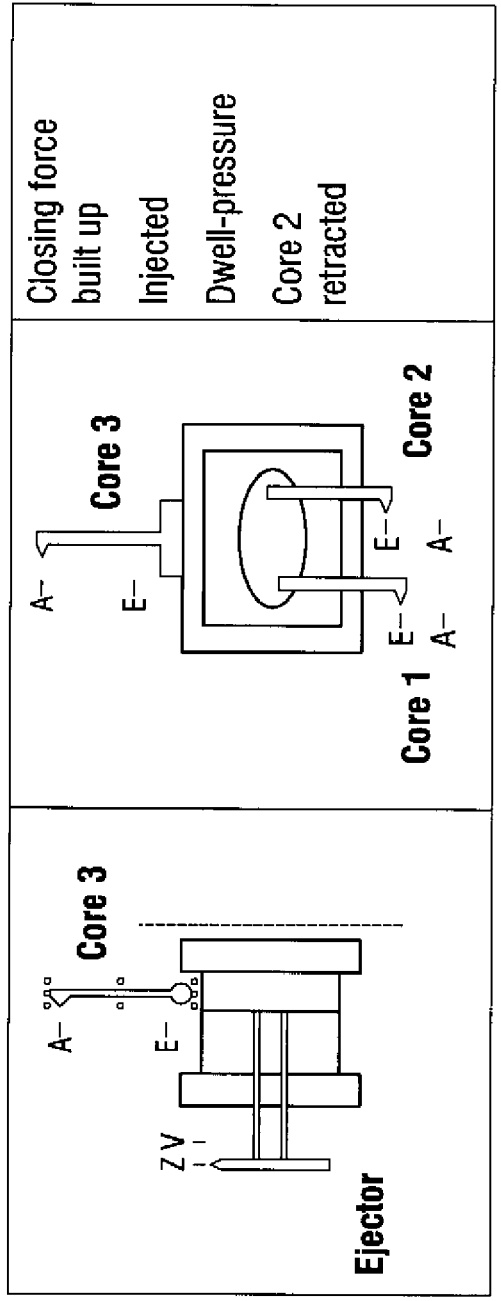

FIG. 3 illustrates the position where a closing force is built up, a plastic melt is injected into the cavity 8, and dwell pressure is maintained. The dwell pressure phase starts by retracting the core 2 (K2 in position E) so as to realize a core stamping function. The times required for retraction and reaching the retracted state are stored. Thereafter, the cooling time starts.

Figure 4:
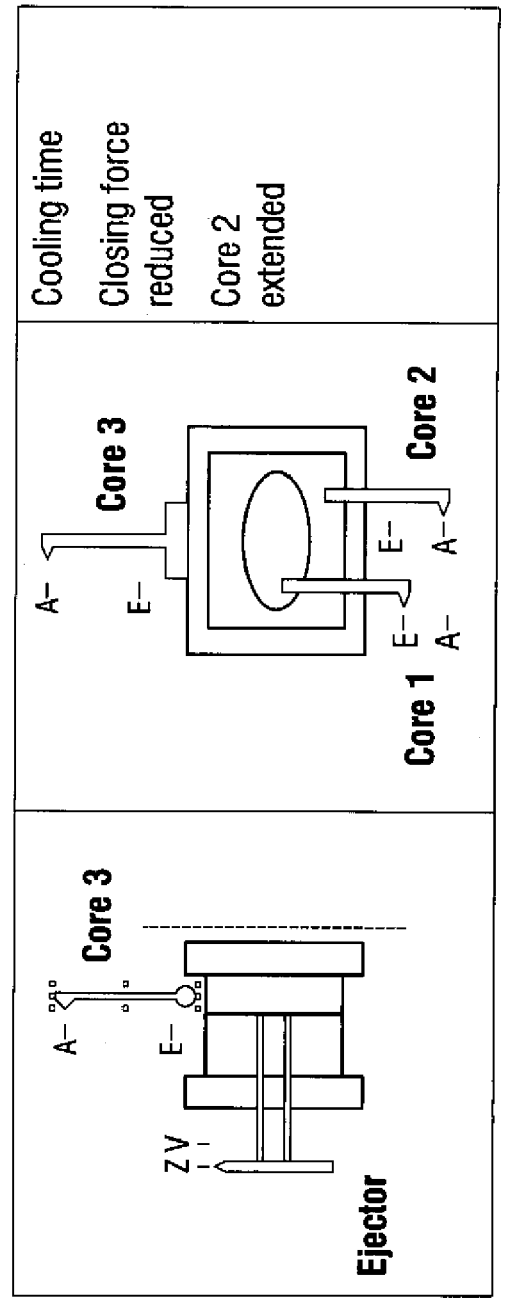
Figure 7:
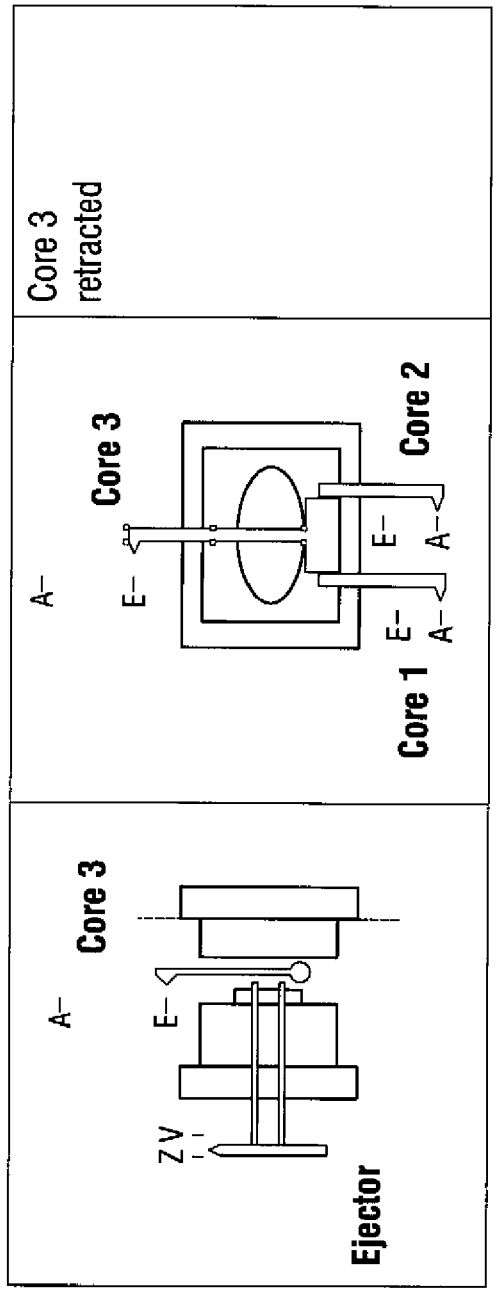
Figure 8:
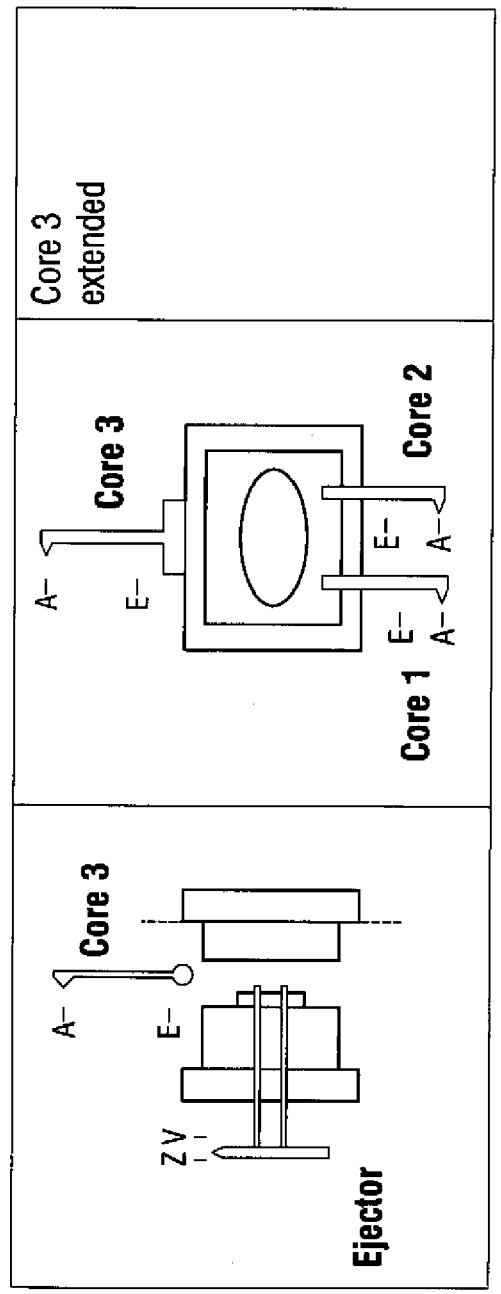

FIG. 4 shows that the closing force is reduced at the end of the cooling time, the core 2 is again extended (K2 in position E), and the attained extended position of K2 is stored.

FIG. 5 shows a position where the movable mold platen 1 as well as the movable half 3 of the injection mold 9 are moved away from the fixed mold platen 2 and the injection mold 9 is opened. The core K1 is thereafter extended (K1 in position A), and the fact that K1 has reached this position is stored.

In FIG. 6, the ejector plate 5 is advanced and the position v is stored.

FIGS. 7 to 10 show positions where the ejector plate 5 advanced, the core K3 is retracted (FIG. 7), then extended (FIG. 8), retracted again (FIG. 9), and finally extended again (FIG. 10), for removing the finished molded part from the ejector rods 6 and 7. The corresponding positions and/or states of the core K3 are then stored in the controller.

Figure 11:
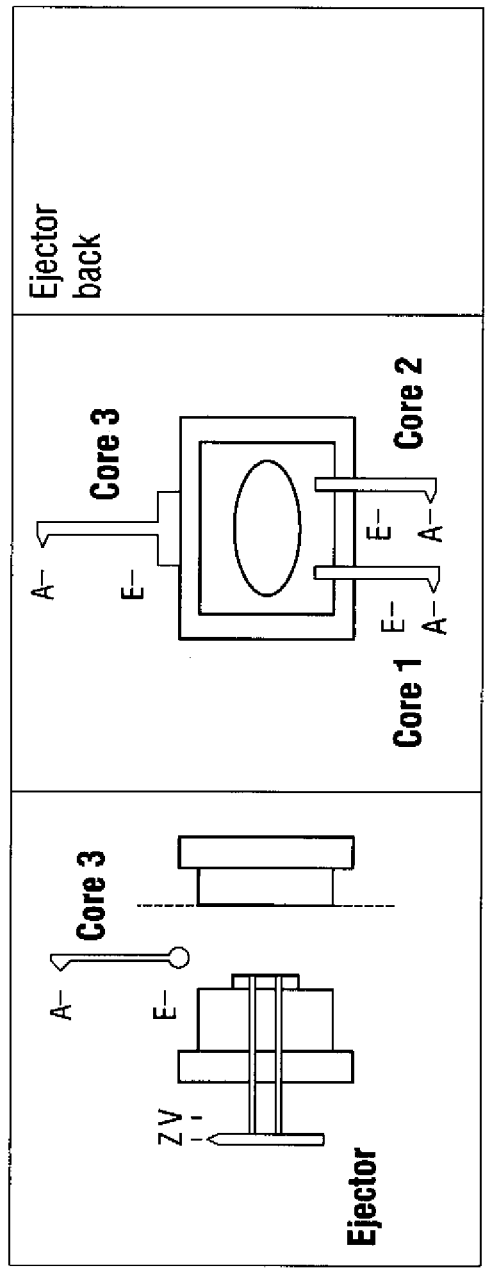

FIG. 11 shows the ejector plate 5 in the retracted position z.

As seen form a comparison between FIGS. 1 and 11, FIG. 11 corresponds exactly to the initial position depicted in FIG. 1, i.e., the entire injection molding cycle was performed once manually, and the process flow is now stored in the machine controller 13.

The speed, with which the movement of the machine parts and/or the mold parts is executed, and the points in time where the positions of the machine parts and/or the mold parts are to be attained, can already be entered during the setup and subsequently changed by the operator. In addition, auxiliary programs can be provided to allow the operator to optimize the process flow.

In addition to the afore-described machine parts, the machine parts of the injection unit as well as peripheral devices can be included in the teach-in mode, commensurate with the injection molding cycle taught to the controller of the injection molding machine.

TABLE 1

| Step (FIG.) | Action | State |
|---|---|---|
| 1 | Start | Mold position 360 mm, ejector position 10 mm, K1 A, K2 A, K3 A |
| 2 | Close mold, retract core 1 | Mold position 0 mm, ejector position 10 mm, K1 E, K2 A, K3 A |
| 3 | (Build up closing force, injection, dwell-pressure) retract core 2 | Mold position 0 mm, ejector position 10 mm, K1 E, K2 E, K3 A |
| 4 | (cooling, reduce closing force) extend core 2 | Mold position 0 mm, ejector position 10 mm, K1 E, K2 A, K3 A |
| 5 | Open mold and extend core 1 | Mold position 360 mm, ejector position 10 mm, K1 A, K2 A, K3 A |
| 6 | Move ejector forward | Mold position 360 mm, ejector position 90 mm, K1 A, K2 A, K3 A |
| 7 | Retract core 3 | Mold position 360 mm, ejector position 90 mm, K1 A, K2 A, K3 E |
| 8 | Extend core 3 | Mold position 360 mm, ejector position 90 mm, K1 A, K2 A, K3 A |
| 9 | Retract core 3 | Mold position 360 mm, ejector position 90 mm, K1 A, K2 A, K3 E |
| 10 | Extend core 3 | Mold position 360 mm, ejector position 90 mm, K1 A, K2 A, K3 A |
| 11 | Move ejector back | Mold position 360 mm, ejector position 10 mm, K1 A, K2 A, K3 A |
| 12 | End | Mold position 360 mm, ejector position 10 mm, K1 A, K2 A, K3 A |

K = core;
A = extended;
E = retracted;
mold position = position of the movable mold half and ejector position in [mm] in relation to a associated distance measuring system While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for programming a process sequence of an injection molding cycle of an injection molding machine having one or more injection molds, comprising the steps of
   placing the injection molding machine in a set-up mode,
   executing a setup cycle manually by moving the machine parts of the injection molding machine or the mold parts of the injection mold(s) sequentially with reduced speed or reduced force, or both, into respective positions required for the injection molding cycle to be performed subsequently,
   recording actions or states, or both, of the machine parts or the mold parts obtained in the setup cycle,
   modifying the recorded actions or states, or both, to optimize the process sequence,
   storing the recorded or modified actions or states, or both, in a memory of a controller, and
   operating the injection molding machine in the injection molding cycle with the process sequence using the stored or modified actions or states, or both.

2. The method of claim 1, wherein the injection molding cycle is manually executed in the set-up mode of the injection molding machine.

3. The method of claim 1, wherein only one or more portions of the injection molding cycle are manually executed in the set-up mode of the injection molding machine.

4. The method of claim 3, wherein the one or more portions include movement of an ejector or of core pullers of the injection mold, or a combination thereof.

5. The method of claim 1, further comprising the steps of providing peripheral devices, manually executing movement of the peripheral devices, and storing actions or states, or both, of the peripheral devices in the memory of the controller.

6. The method of claim 1, wherein the process sequence is optimized by automatically executing the setup cycle by recording and modifying the actions or states, or both, at least twice before storing the recorded or modified actions or states, or both, and operating the injection molding machine.

* * * * *